Dec. 14, 1965  H. BIEHL  3,223,071

FEEDING TROUGH AND FLOOR ARRANGEMENT

Filed May 6, 1964

INVENTOR:
Heinrich Biehl
By Beaman & Beaman
attys

United States Patent Office 3,223,071
Patented Dec. 14, 1965

3,223,071
FEEDING TROUGH AND FLOOR ARRANGEMENT
Heinrich Biehl, Gut Heinrichshof, near
Trittau, Germany
Filed May 6, 1964, Ser. No. 365,316
Claims priority, application Germany, June 25, 1963,
B 72,415
2 Claims. (Cl. 119—28)

The invention relates to a feeding trough for a stable to keep livestock, especially pigs.

In agriculture, it becomes more and more necessary to feed and water the animals kept with a minimum amount of, labour, without doing any prejudice to the quality of the feeding and watering of the animals. The conventional troughs could be cleaned only with difficulty and at the expense of considerable amounts of work and time, so that it had always to be expected that remainders from watering or feeding actions might remain in the trough and mutually distract from each other's qualities. If the animals were fed on ensilaged forage instead of coarse-ground corn, the difficulties in connection with an irreproachable cleaning of the trough and the faulty conditions resulting from a contamination of the trough were still enhanced.

It is the object of the invention to provide a feeding trough for a stable to keep livestock, preferably pigs, which may be cleaned in an extremely simple and inexpensive manner so that in addition to a reduction in time and labour spent on cleaning the trough, also an improvement of the feeding and watering is obtained.

In accordance with the invention, this problem is solved in that the trough extending longitudinally with substantially one and the same cross section of the inner profile thereof is open at least on one side and in that the bottom surface of the inner profile is provided with an elevation on this open side which prevents a drain of liquid or pulp outside beyond this elevation. It is possible in this manner to push all remainders from feeding and watering towards the open side and out of the trough with the aid of a cleaning device adapted to the shape of the trough. As such a device, especially a rubber slide adapted to the inner profile of the trough has proved suitable which is fastened to a handy stem. By moving said rubber slide along the trough towards the open side thereof, the feeding trough may be properly cleaned from a quality standpoint approximately at walking speed.

In principle, only the one side of the trough need be designed to be open in this manner but it is also possible to design both sides of the trough open in the manner as described with the trough having its deepest point in its center with respect to the longitudinal direction thereof.

Another advantage of the subject matter of the invention consists in that the watering is substantially simplified. With conventional troughs, the maintenance personnel used to take care not to pour too much water into the trough than would be surely consumed by the animals until the next feeding hour because it was difficult to remove the remainder of water and the remainder of forage and dirt contained therein. The result of this was that the animals did not get sufficient water in many cases. Furthermore, it was experienced again and again that the ration required at the next meal time was charged into the trough without taking into account the amount of water still present in the trough to the size of this ration. When feeding with coarse-ground corn, the result was that the mixture to be made of coarse-ground corn and water was too much like a soup which is prejudicial to the food evaluation. Thus, the conventional troughs are known by experience to have the drawback that the animals get either too little water or they get a forage pulp which is too much like a soup. These disadvantages are likewise safely avoided by the subject matter of the invention. The feeding trough made in accordance with the invention is provided with a drain which becomes automatically operative as soon as a certain capacity of the trough is exceeded. The cleaning of the trough is so much simplified that the maintenance personnel need not have any hesitation to supply the animals richly with water. As the cleaning of the trough prior to the next meal time must anyway be carried through only with water, the amount of water which remained from watering is of no account whatever even from the standpoint of the maintenance personnel. Preferably, the elevation is made with no steps, in particular in the form of a wedge.

This idea may be carried out in such a manner that the trough terminates in a one-side open mouthpiece the inner profile of which being substantially in register with that of the trough, is as a whole sloped upwardly. But it is also possible to realize the idea in such a manner that the inner profile of the trough is sloping upwardly along its entire length towards its open side.

It is furthermore recommendable to extend the open end of the trough in a direction towards the livestock area of the stable. Finally, it may be recommendable to completely close that side of the trough which faces away from the livestock area of the stable proper so that the feeding trough is open only towards the livestock area of the stable and is cleaned only in a direction towards the livestock area with the aid of the cleaning tool. In a further embodiment of the subject matter of the invention, an end wall covering the open profile of the trough is provided at a space from the open end of the trough, in which the distance between the edges of said open end and the closing wall is dimensioned to be such that flow cross-sectional area resulting in this manner is smaller than the cross-sectional area of the inner profile of the trough. Thus, a certain throttling is resulting for the open side of the trough so that the possibility of a certain loss of ensilaged forage or coarse-ground corn forage through this open side is reduced.

Preferably, the trough formed in accordance with the invention is arranged along one side of a livestock pen area between said pen area and a feeding passageway, wherein this livestock pen area is drained towards the opposite side.

The invention is preferably made use of in connection with a stable in accordance with the patent application No. 345,621 of February 18, 1964. This older patent application relates to a piggery having several pens arranged along a feeding passageway and is characterized in that it is connected with the open air only through doors and ventilator openings and in that each individual pen of the pens freely air communicating with each other beyoung the run area for the pigs is subdivided into an eating and sleeping area and a dunging area, wherein the eating and sleeping area is drained towards the dunging area and the dunging area is drained towards a dung channel arranged at that side of the dunging area facing away from the feeding passageway and leading to a dung collecting basin and in that the dunging area is provided on its side near the feeding passageway with a rinsing pipe extending the entire length thereof for the supply of water the exit openings of which or nozzles are opening towards the dunging area.

In this connection it is recommendable to arrange the open end of the trough provided in accordance with the invention in the region of the dunging area of each pen so that all the remainders from feeding and watering which are removed from the feeding trough in the manner as described, are conveyed into the dunging passage immediately with the removal of dung from the dunging area. In accordance with the patent application No. 345,621 of February 18, 1964, this dunging passage is arranged on the side facing away from the feeding or stable passageway. In this dunging passageway, there are terminating the draining passages of the dunging area of the individual pens arranged on the one side of the feeding passage. The bottom of the dunging area is inclined towards the draining passage from the feeding passageway, while the eating and sleeping area is sloping obliquely towards the outer and lower corner of the dunging area.

In accordance with this older patent application, each one of the pens of a piggery is destined to accommodate a like number of pigs for fattening of different ages and thus of different fattening stages, with the length of the pens looking in the direction of the feeding passageway and thus their size corresponding essentially to the age of the pigs provided for the individual pens and all the pens together accommodating pigs of one entire fattening period, the size of the dunging area of each pen being equal only to about ¼ to ⅛ of the entire area of the pen.

The invention makes possible also an automatic watering of all the pens of a piggery by means of one single valve.

Such an automatic watering device for all the pens of a piggery by means of one valve has not been possible heretofore, because the average weight of the occupants of the individual pens and thus the amount of drinking water required are fluctuating in rather wide limits. It is possible with the aid of the invention to carry out a watering of all the pens automatically using one single valve. The water supply is controlled by means of a magnetic valve and a timer.

The beginning of the water supply is started for instance by means of a pressure button control. The time of the water circulation is adjusted in such a manner that the largest pen receives the amount of water sufficient for it. In the pens with smaller occupants the superfluous water is draining off via the elevated open end of the feeding trough.

The attached drawing shows some embodiments of the subject matter of the invention in a simplified manner.

Figure 1:
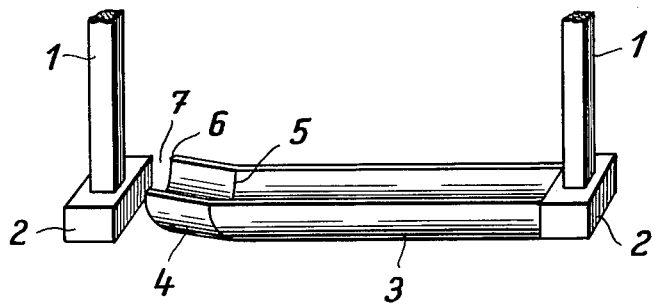
FIG. 1 shows a perspective view of a feeding trough made in accordance with the invention.

In the drawing 1 designates roof posts to support the roof which are abutting a socket 2. In accordance with FIG. 1, the feeding trough consists of a longitudinally extending main portion or main piece 3 having a uniform inner profile with an end portion or end piece 4 adjoining it. The end portion 4 has the same inner profile as has the main portion 3 and is but slightly lifted upwardly from the line 5. The amount by which said end piece 4 is elevated measured in the vertical plane, is governed by the kind of the forage and also the amount of water which is to be made available for the individual waterings. Between the end edge 6 of the end piece 4 and the socket 2, there is a free space 7. As will be seen from FIG. 1, the end piece 4 is additionally bent off into the plane of the drawing where there is disposed the area of the piggery and, in particular, the dunging area of the piggery which is slightly sloping downwardly towards the opposite dunging passage. Forward of the plane of the drawing, there is a feeding passageway.

Figure 2:
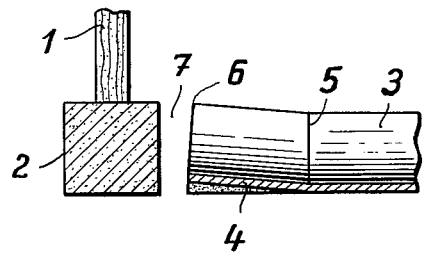
FIG. 2 is an enlarged sectional view taken on the open end of a feeding trough made in accordance with the invention.

In FIG. 2 the end piece 4 is shown in some more detail. In the embodiment shown by way of example it is 12 inches long and is lifted by 1.6 inches in the form of a wedge. The distance between the edges of the end piece and the socket 2, i.e., the length of the free space 7, is about 4 inches.

Figure 3:
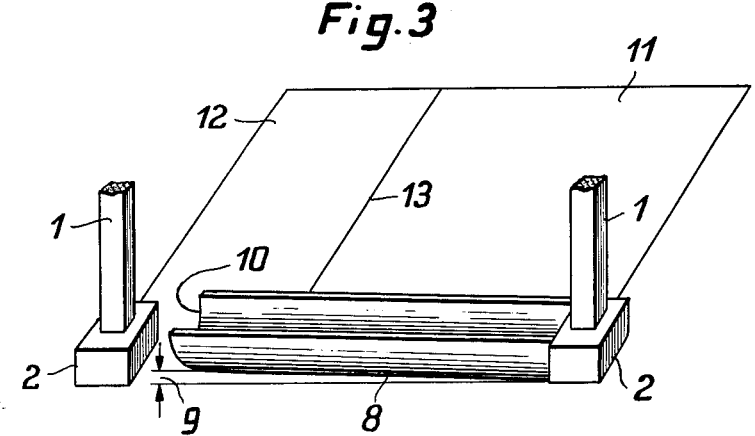
FIG. 3 is a perspective view taken on another design of the subject matter of the invention.

The same measures have been equally selected in the embodiment in accordance with FIG. 3, but the invention is not in any way restricted to these measures.

In accordance with the embodiment of FIG. 3, the entire feeding trough is lifted by a distance 9 towards the open side 10, so that the whole feeding trough is extending in the form of a wedge. 11 designates schematically the sleeping area of the pen of the piggery belonging to this trough 8, while 12 designates the dunging area of this pen. The border between these two areas bears the reference numeral 13. It will be seen from this representation that the open side of the feeding trough terminates within the region of the dunging area.

I claim:

1. In combination, a livestock area, a dung area defined in said livestock area, a feeding trough for livestock within said livestock area comprising a trough body of elongated configuration having a bottom portion and wall portions extending upwardly from said bottom portion, upper edges defining the upper termination of said wall portions, said trough body being of uniform cross-sectional configuration throughout its length, ends defined on said trough body adapted to confine the material being fed within said trough, at least one of said ends being defined by a weir edge lying within the configuration of said bottom portion and vertically disposed between the lowermost portion of said bottom portion and the lowermost portion of said upper edges, said weir edge regulating the maximum depth of water or flowable feed confinable within said trough and being disposed over said dung area whereby trough contents discharged over said weir edge are received upon said dung area.

2. In combination, a livestock area, a dung area defined in said livestock area, a feeding trough for livestock within said livestock area comprising a trough body of elongated configuration having a bottom portion and wall portions extending upwardly from said bottom portion, upper edges defining the upper termination of said wall portions, said trough body being of uniform cross-sectional configuration throughout its length, ends defined on said trough body adapted to confine the material being fed within said trough, at least one of said ends including an upwardly deflected portion including a bottom surface and wall surfaces, the cross-sectional configuration of said deflected portion identically corresponding to that of the remainder of said trough, said deflected portion having a terminating end edge corresponding to the cross-sectional configuration thereof, said end edge at said bottom surface defining a weir edge vertically disposed between the lowermost portion of said trough bottom portion and the lowermost portion of said upper edges, said weir edge regulating the maximum depth of water or flowable feed confinable within said trough and being disposed over said dung area whereby trough contents discharged over said weir edge are received upon said dung area.

References Cited by the Examiner

UNITED STATES PATENTS

| 733,448 | 7/1903 | Williams | 119—61 |
| 1,294,366 | 2/1919 | Louden | 119—27 |
| 1,358,484 | 11/1920 | Walters | 119—61 |
| 1,483,376 | 2/1924 | Price | 119—27 |
| 1,682,614 | 8/1928 | Guertin | 119—72 X |

FOREIGN PATENTS

| 847,027 | 9/1960 | Great Britain. |

SAMUEL KOREN, *Primary Examiner.*

HUGH R. CHAMBLEE, *Examiner.*